US012031590B2

United States Patent
Finkenzeller

(10) Patent No.: US 12,031,590 B2
(45) Date of Patent: Jul. 9, 2024

(54) PRESSURE MEDIUM-ACTUATED SEPARATING CLUTCH WHICH IS NORMALLY CLOSED, COMPRISING AN ACTUATION DEVICE WHICH ROTATES THEREWITH AND AXIALLY OVERLAPS WITH A DAMPER DEVICE

(71) Applicant: Schaeffler Technologies AG & Co. KG, Herzogenaurach (DE)

(72) Inventor: Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/019,534

(22) PCT Filed: Jul. 7, 2021

(86) PCT No.: PCT/DE2021/100591
§ 371 (c)(1),
(2) Date: Feb. 3, 2023

(87) PCT Pub. No.: WO2022/028642
PCT Pub. Date: Feb. 10, 2022

(65) Prior Publication Data
US 2023/0286367 A1    Sep. 14, 2023

(30) Foreign Application Priority Data
Aug. 4, 2020    (DE) .................... 10 2020 120 523.6

(51) Int. Cl.
*F16D 25/0635*    (2006.01)
*B60K 6/387*    (2007.10)
(Continued)

(52) U.S. Cl.
CPC .......... *F16D 25/0635* (2013.01); *B60K 6/387* (2013.01); *F16D 13/70* (2013.01); *F16F 15/13121* (2013.01); *B60K 2006/4825* (2013.01)

(58) Field of Classification Search
CPC .. B60K 6/387; B60K 6/40; B60K 2006/4825; F16D 25/063–25/0638;
(Continued)

(56) References Cited

U.S. PATENT DOCUMENTS 6,332,521 B1    12/2001    Shoji
2004/0154893 A1    8/2004    Braford

FOREIGN PATENT DOCUMENTS

| DE | 102009059944 A1 | 7/2010 | |
| DE | 102013216509 A1 * | 3/2014 | ............ F16F 15/139 |
| DE | 102015225421 A1 | 6/2017 | |
| DE | 102016221948 A1 | 6/2017 | |

(Continued)

OTHER PUBLICATIONS

Source: Unpublished Application No. DE 102019130586.1 Application Filing Date—Nov. 13, 2019 Assignee: Schaeffler Technologies AG & Co.KG.

*Primary Examiner* — Richard M Lorence

(57) ABSTRACT

A separating clutch for a powertrain includes a rotational axis, a friction pack for transmitting a torque in an engaged state, a damper device having a torsional vibration damper or a centrifugal pendulum, and an actuation device for selectively releasing the engaged state. The actuation device is arranged in an axial overlap with the damper device. The friction pack may include a friction disk, a pressure plate, a counter-plate, a pressure pot, and a disk spring supported between the counter-plate and the pressure pot. The friction disk may have a friction surface and the pressure pot may extend through the counter-plate to contact the pressure plate, radially outside of the friction surface, and the actuation device, radially inside of the friction surface. The (Continued)

actuation device may include a pressure chamber with a pressure piston, and the pressure piston may be axially movable and arranged radially within the friction pack.

15 Claims, 1 Drawing Sheet

(51) Int. Cl.
  *F16D 13/70*    (2006.01)
  *F16F 15/131*    (2006.01)
  *B60K 6/48*    (2007.10)

(58) Field of Classification Search
  CPC .......... F16D 13/38–13/56; F16D 13/70; F16D 13/71; F16D 47/02; F16D 2300/22; F16F 15/13121
  See application file for complete search history.

(56) References Cited

FOREIGN PATENT DOCUMENTS

| | | |
|---|---|---|
| DE | 102019124101 A1 | 3/2021 |
| DE | 102019130192 A1 | 3/2021 |
| DE | 102019129313 A1 | 5/2021 |
| DE | 102019130178 A1 | 5/2021 |
| FR | 2871109 A1 | 12/2005 |
| FR | 3073784 A1 | 5/2019 |
| JP | H03219121 A | 9/1991 |
| JP | 200298168 A | 4/2002 |
| JP | 2013512391 A | 4/2013 |
| JP | 2015509173 A | 3/2015 |
| JP | 201762029 A | 3/2017 |
| WO | 2013113527 A1 | 8/2013 |
| WO | WO-2017084660 A1 * | 5/2017 ............. F16D 13/76 |
| WO | 2018078029 A1 | 5/2018 |
| WO | 2019034345 A1 | 2/2019 |
| WO | 2020164650 A1 | 8/2020 |
| WO | 2021063435 A1 | 4/2021 |

* cited by examiner

PRESSURE MEDIUM-ACTUATED SEPARATING CLUTCH WHICH IS NORMALLY CLOSED, COMPRISING AN ACTUATION DEVICE WHICH ROTATES THEREWITH AND AXIALLY OVERLAPS WITH A DAMPER DEVICE

CROSS-REFERENCE TO RELATED APPLICATIONS

This application is the United States National Phase of PCT Appln. No. PCT/DE2021/100591 filed Jul. 7, 2021, which claims priority to German Application No. DE102020120523.6 filed Aug. 4, 2020, the entire disclosures of which are incorporated by reference herein.

TECHNICAL FIELD

The present disclosure relates to a separating clutch with a rotational axis for a powertrain, a powertrain with such a separating clutch, and a motor vehicle with such a powertrain.

BACKGROUND

Separating clutches are known in the field of motor vehicles, for example with a hybridized powertrain, and are used to separate a torque transmission between a drive machine, for example an internal combustion engine, and a transmission for propelling the motor vehicle. The separating clutch described below can be used, for example, in a hybridized powertrain of a motor vehicle with a configuration referred to as P3. With a P3 configuration, the electric drive machine is arranged between the clutch and the output of the motor vehicle. For example, in one embodiment with a double shift transmission, the electric drive machine is connected to one of the two torque-transmitting shafts. In another example embodiment, the electric drive machine is connected downstream of a shift transmission, designed, for example, as a unit having a differential.

In order to be able to meet the increasingly stringent emission standards and the required fleet consumption, almost all automobile manufacturers rely on hybridization of the powertrain. In order to save weight and installation space, the electric drive motor is placed directly behind the torsional vibration damper of the combustion engine or in a (hybridized) dual-clutch transmission. The two drive sources (internal combustion engine and electric drive machine) are separated by means of the separating clutch. The separating clutch should be realized in as space-neutral a manner as possible and combined with a desired or necessary damping device in the best possible way. In order to meet the high demands on the isolation, it is also often desirable to integrate a centrifugal pendulum absorber as space-neutrally as possible.

SUMMARY

The present disclosure relates to a separating clutch with a rotational axis for a powertrain, having at least the following components:
 a normally-closed friction pack for transmitting a torque in an engaged state;
 a co-rotating hydrostatic actuation device for the switchable release of the engaged state of the friction pack; and
 a damper device comprising a torsional vibration damper and/or a centrifugal pendulum.

The actuation device may be arranged in axial overlap with the damper device, at least in the extended state.

In the following, reference is made to the stated rotational axis when the axial direction, radial direction or the circumferential direction and corresponding terms are used, unless explicitly stated otherwise. Unless explicitly stated otherwise, ordinal numbers used in the preceding and subsequent description are used only for the purposes of clear distinction and do not indicate an order or a ranking of designated components. An ordinal number greater than one does not necessarily mean that another such component must be present.

The separating clutch proposed here is set up for the switchable release of a transmission of a torque about the central rotational axis between at least one drive machine and a consumer. For releasably transmitting torque, a normally-closed running friction pack is provided. The friction pack comprises friction elements, which in the engaged state (i.e., in the normal state) is set up for frictionally transmitting a (predetermined maximum) torque. Such a friction pack is designed in one embodiment as what is termed a disk clutch having at least one clutch disk or as a disk pack having a plurality of inner disks and outer disks. In order to be able to release the torque transmission in a switchable manner, a hydraulic or hydrostatic actuation device is provided, wherein a hydrostatic pressure must be increased in order to cancel the normal condition of the friction pack, i.e., the torque transmission.

The drive side, i.e., the side facing towards a drive machine, for example an internal combustion engine, is often also referred to as the input side, because when considering a torque flow starting from the drive machine (torque source), the torque from the drive machine enters the separating clutch. Accordingly, in such an application, the output side, i.e., the side towards a transmission, is referred to as the output side, because in the corresponding consideration the output or the transmission forms the torque sink or the connection to a consumer. It should be noted that the output side in this consideration of the torque flow is not necessarily directly the input side of a manual transmission, but may be another shift clutch, e.g., a double shift clutch, connected directly or indirectly downstream.

In the case of the separating clutch proposed here, this hydrostatic actuation device is designed to rotate as well. This hydrostatic actuation device, therefore different from, for example, a hydraulic central slave cylinder [CSC: Central Slave Cylinder], is executable without an actuation bearing. This saves installation space in the axial and radial direction, especially in the area of the torque-transmitting shaft, where a central slave cylinder of this type would otherwise need to be arranged.

Furthermore, a damper device is integrated into the separating clutch, which comprises a torsional vibration damper (for example a dual-mass flywheel, a multi-flange damper or a rocker-type damper) and/or a centrifugal pendulum. The damper device may be arranged close to the drive machine, so that this (in the case of an electric drive machine) is freed from external rotational irregularities and (in the case of an internal combustion engine) rotational irregularities in the torque source are isolated from the powertrain as early as possible. It should be pointed out that the separating clutch proposed here can also be used in a configuration of a powertrain which deviates from the P3 configuration mentioned at the outset, for example in a configuration according to the known designations:

P0 (motor firmly connected to the combustion shaft of the combustion engine in relation to the transmission on the rear of the combustion engine), P1 (motor firmly connected to the combustion engine shaft between the combustion engine and the transmission), P2 (torque-transmitting connection with the combustion engine shaft that can be separated by a clutch) and P4 (separate electric axis), as well as a combination thereof, of which P0+P2, P1+P2 and P2+P4 are particularly mentioned here, wherein a combination comprises a corresponding plurality of electric drive machines.

Here is now proposed that the actuation device and the damper device are axially compact in that the actuation device, at least in the extended state, i.e., in the maximum axial extension when canceling the normal state, is at least partially arranged in axial overlap with the damper device. Thus, the otherwise conflicting requirements of an actuator are solved; namely, one of the requirements is to allow a high torque that can be transmitted via the output-side shaft (for example, the transmission input shaft) and another requirement is to use a small axial installation space.

In a co-rotating hydrostatic actuation device, at high speeds resulting from the centrifugal force, an axial pressure is generated in the direction of actuation, so that the friction pack is forced out from its normal state. Because the friction pack is normally designed to be closed, this disadvantage of a co-rotating hydrostatic actuation device is compensated because this actuating effect only has an effect at high speeds when no high torques must be transmitted. In one configuration of the separating clutch, it can happen that the actuation device is forced in the open direction as a result of the influence of centrifugal force at high speeds, and the maximum transmissible torque is therefore reduced. The function of the separating clutch is therefore not affected by this.

On the contrary, with a normally-open separating clutch, the friction pack is more strongly closed by the actuation device at high speeds (actuation direction), and thus the (also passive) actuating forces for opening the friction pack are increased. An additional compensating counterforce must then be provided. With the normally-closed separating clutch proposed here, the forces interact in the correct direction for the specific application.

It is also proposed in an example embodiment of the separating clutch that the friction pack comprises a friction disk, a pressure plate, a counter-plate, a pressure pot and a plate spring, wherein the plate spring may be supported between the counter-plate and the pressure pot.

It is proposed here that the friction pack of the separating clutch is designed as a disk clutch, having a (e.g., single) friction disk, a (e.g., single) pressure plate, a (e.g., single) counter-plate, a pressure pot and a plate spring, which is designed, for example, as a plate spring assembly. The friction disk can be engaged axially between the pressure plate and the counter-plate, wherein by the plate spring in the normal state, in which therefore no actuating force is applied by the actuation device to the friction pack, the pressure plate is pressed or pulled toward the counter-plate. A frictional connection is thus formed axially on both sides by the friction disk, specifically with the pressure plate and with the counter-plate. In this normal state, a predetermined torque range is transmittable. The preload of the plate spring thus determines the maximum torque that can be transmitted. It should be noted that the disk spring may be designed as a diaphragm spring, by which in a normal state a higher or equal axial force is exerted than in an extended state, and, the (e.g., only) operating maximum of the axial force of the diaphragm spring lies between the normal state and the extended state.

In an example embodiment, the disk spring is supported between the counter-plate and the pressure pot, so that the pressure plate is pulled by the pressure pot in the normal state against the friction disk and the friction disk is pulled against the counter-plate. Such an embodiment with a small pressure pot or a small section of the pressure pot from the point of view of the pressure plate beyond the counter-plate is desirable for many areas of application in order to utilize existing installation space. In other words, an embodiment that is neutral in terms of installation space is favored.

In one embodiment, the disk spring is supported on the counter-plate and/or on the pressure pot via a wire ring, so that a defined support and/or the use of material for the counter-plate or the pressure pot can be optimized in terms of surface hardness in order to avoid indentations (with a soft surface) or pressure fracture behavior (in the case of brittle surfaces).

In an example embodiment, a plurality of leaf springs are provided between the counter-plate and the pressure pot or the pressure plate distributed over the circumference (e.g., balanced and/or evenly), which may be designed to act antagonistically against the plate spring, so that a basic tension and/or lifting of the pressure plate is ensured in the extended state. In an example embodiment, each of the leaf springs is designed as a leaf spring assembly. In an example embodiment, each of the leaf springs is riveted on the plate side, i.e., with the pressure plate and the counter-plate.

It is also proposed in an example embodiment of the separating clutch that the pressure pot, for force-transmitting contact with:

the pressure plate radially outside the friction surface of the friction disk, and the actuation device radially inside the friction surface of the friction disk is arranged to extend through the counter-plate.

A pressure pot is proposed here, which can be used well in an existing installation space, wherein this pressure pot is arranged to extend through the counter-plate twice, namely once for connecting to the pressure plate and once for connecting to the actuation device. A clamp is formed radially around the friction surface of the friction disk by the pressure pot with its fingers extending through. This means that an embodiment that is neutral in terms of installation space is favored.

Such a pressure pot is also easy to assemble and the pre-stressing force of the disk spring can be adjusted at a very late stage. In an example embodiment, the pressure pot extends in complete radial overlap with the damper device and the actuation device protrudes (for contact with the pressure pot) radially into the region of the damper device.

It is also proposed in an example embodiment of the separating clutch that the actuation device comprises a pressure chamber having an axially movable pressure piston which is radially arranged within the friction pack, e.g., radially within a torque connection of the friction disk according to an embodiment according to the above description.

In this embodiment, it is proposed that the co-rotating hydrostatic actuation device comprises a pressure chamber in which an axially movable pressure piston is arranged with a corresponding seal. The pressure piston can thus be moved axially by means of an increase in volume or pressure. With a small (e.g., minimal) volume, there is no actuation force on the friction pack, so the friction pack then adopts the normal state or remains in it. In the case of a large (e.g., maximum) volume, the pressure piston is extended and the pressure piston exerts a (large or maximum) actuation force on the friction pack, so that the friction pack then assumes the extended state or is (actively) held therein. For example, the actuating force is transmitted from the pressure piston by means of a connection to the pressure pot according to an embodiment of the above description.

The pressure chamber and the axially movable pressure piston are radially arranged within the friction pack and are in axial overlap with the friction pack or partially (towards the damper device) axially offset thereto, or may be completely outside an axial overlap with the friction pack. This creates a gain in axial installation space in the central area of the separating clutch, that is to say in the torque-transmitting shaft, for example a transmission input shaft.

In an example embodiment, the actuation device is completely radially arranged within a torque connection of the friction disk according to an embodiment according to the above description, and may be arranged in axial overlap with this torque connection. Such a torque connection is, for example, an interface of the friction pack with the damper device, for example designed as a spline, wherein on the friction disk side, the torque connection may include an axially relatively stiff disk-like element, on which a lamellar receptacle for friction linings (for example comprising a lining spring) is arranged with a relatively low axial stiffness.

It is also proposed in an example embodiment of the clutch that the pressure piston has a radial outer section and a radial inner section, wherein between said sections a step is formed with a wall section with axial extension, wherein between said wall section and a corresponding lateral rear wall of the pressure chamber radially inside, a gap space is formed with axial extension.

In this embodiment, it is proposed that the pressure chamber and the corresponding pressure piston be divided into at least two radial sections, wherein a step is formed between the two sections, with a wall section with an axial extension, e.g., with a purely parallel extension to the rotational axis of the separating clutch. The pressure chamber has a corresponding lateral rear wall, wherein between the axial wall section of the pressure piston and the lateral rear wall, a gap space is formed radially inside (in a retracted state corresponding to the normal state). The volume of the pressure chamber is therefore very small and the pressure piston is stiffened as a result of the step in comparison to an embodiment of the pressure piston which is planar in the radial direction.

In an example embodiment, at the rear of the gap space, i.e., radially on the outside of the lateral rear wall of the pressure chamber, a seal is formed to the pressure piston, wherein therefore a C-shape is formed in profile around this side rear wall.

In an example embodiment, the separating clutch (at least the friction pack and/or the damper device) is of a dry design. In one embodiment, a small flow of hydraulic fluid from the pressure chamber of the actuation device into the area of the friction linings and/or the damping device is not completely prevented. Air cooling may also be decisive for the heat that occurs primarily during a clutch operation if the hydraulic fluid possibly enters the dry area of the separating clutch.

It is also proposed in an example embodiment of the separating clutch that the pressure piston is formed radially outside a sealing wall and the pressure chamber is formed to be parallel to a rear wall lateral to the sealing wall, e.g., according to an embodiment according to the above description, with a radial seal external to the sealing wall of the pressure piston, wherein the pressure piston may be centered by means of the seal.

The pressure chamber has a radial external seal on the axial rear wall of the pressure chamber, which is designed, for example, as described above. The pressure piston comprises a sealing wall which runs parallel thereto and which slides over the seal in accordance with the axial stroke movement of the pressure piston. For example, the pressure piston forms a C-shape in profile around the axial rear wall of the pressure chamber.

Because in the interaction of the axial lifting movement of the seal wall and the axial fixed rear wall, e.g., comprising the then axially fixed seal, a large axial length is necessary and would need to be arranged axially radially inside the axial rear wall of the pressure chamber, axially adding to the stroke, a small axial installation space within which to arrange the seal radially outside, i.e., away from the pressure chamber may be included. Thus, the length section of the stroke of the pressure piston with the seal or with the sealing-effective length section of the seal wall and the axial rear wall is arranged so as to overlap each other axially. In this case, existing installation space can also be used efficiently for a force-transmitting connection of the pressure piston to the pressure pot.

Irrespective of this, the pressure piston may be centered by means of the axial rear wall, e.g., radially outside. The seal may include a slide ring, by means of which the pressure piston is centered at a radial distance from the axial rear wall and with low friction. In addition, a first dirt repellency is created by means of the slide ring, especially in a dry embodiment of the separating clutch, to protect the sealing surface of a sealing ring of the seal arranged on the pressure chamber side of the slide ring. In an example embodiment, the components of the seal (for example a sealing ring and/or a slide ring) are received in a ring-shaped manner in the axial rear wall of the pressure chamber, e.g., radially outside, in a corresponding groove and are thus fixed axially.

It is also proposed in an example embodiment of the separating clutch that the friction disk according to an embodiment according to the above description is permanently connected in a torque-transmitting manner to the damper device, e.g., by means of a spline.

In this embodiment, the friction disk is connected to the damper device, wherein the damper device may be arranged on the drive side (for example on the combustion engine side) and the pressure plate and counter-plate may be arranged on the output side (for example on the transmission side).

The separating clutch proposed here is therefore largely responsible for completely decoupling the drive machine from the torque flow, i.e., for separating it. In one embodiment, the separating clutch is set up to accelerate to at least an idle speed and/or to synchronize the combustion engine shaft and the transmission shaft while smoothing out a torque difference when starting the engine (designed as an internal combustion engine).

In an example embodiment, the friction disk is permanently connected in a torque-transmitting manner to the damper device by means of splines, wherein the friction disk is displaceable axially relative to the damper device (as easily as possible). This means that the drag torque in the friction pack is low because the friction disk follows the axial lifting forces with little resistance when the friction pack is open, i.e., it can easily lift off the pressure plate and the counter-plate. As already described above, the actuation device may be arranged at least partially in an axial overlap with these splines.

In an example embodiment, the damper device comprises at least one primary flange and one secondary flange, wherein the primary flange is arranged on the engine side and the secondary flange is arranged on the friction pack side. The primary flange and the secondary flange can be pre-assembled as a unit and are pre-centered with respect to one another prior to mounting in the separating clutch. In an example embodiment, the centering of the primary flange with respect to the secondary flange in the separating clutch can be set or adjusted during mounting of the friction pack, wherein the friction disk may be centered with respect to the pressure plate and the counter-plate at the same time, for example by means of the splines.

In an example embodiment, a centrifugal pendulum is arranged on the secondary flange, for example radially inside a spring assembly between the primary flange and the secondary flange.

According to a further aspect, a powertrain is proposed, having at least the following components:
   at least one drive machine having a machine shaft;
   a transmission for transmitting a torque of the at least one machine shaft to a consumer; and
   a separating clutch according to an embodiment according to the above description, wherein a torque between at least one of the drive machines and the consumer can be releasably transmitted by means of the separating clutch.

The powertrain proposed here comprises a separating clutch in an embodiment according to the above description, with the separating clutch transmitting torque from the prime mover or its machine shaft to at least one consumer, for example the drive wheels in a motor vehicle, by means of an actuating force or pressing force applied by the hydrostatic actuation device to the friction pack can be switched, i.e., it is releasable. This by no means excludes reverse torque transmission from the consumer to the machine shaft, in a motor vehicle, for example, in order to use the engine brake to decelerate the motor vehicle and/or to recuperate braking energy. The drive machine is, for example, an internal combustion engine and/or an electric drive machine. In one embodiment, the input side of the separating clutch is connected in a torque-proof manner to the machine shaft, e.g., a combustion engine shaft, and the output side is connected in a torque-proof manner to the at least one consumer (at least indirectly, for example via a transmission). The transmission may include a dual clutch and a dual shift transmission. The powertrain may be hybridized, wherein, according to a P3-configuration, an electric drive motor for torque output may be involved downstream of a double-shift gearbox or in one of the two parallel trains (for example comprising the even-numbered gears).

With the separating clutch proposed here, a compact structure is achieved without disadvantages relating to the dynamic behavior, for example the required transmittable torque, so that this separating clutch can be integrated into a powertrain, especially into a hybridized powertrain, in a space-neutral manner with high power density.

According to a further aspect, a motor vehicle is proposed having at least one drive wheel, which can be driven by means of a powertrain according to an embodiment according to the above description for the propulsion of the motor vehicle.

The installation space is small, precisely in motor vehicles due to the increasing number of components, and it is therefore advantageous to use a small-sized powertrain. With what is termed the desired downsizing of the drive machine with a simultaneous reduction in the operating speeds, the intensity of the disruptive torsional vibrations and also with increasing torques or a reduction in the size of the separating clutch, the demand on the actuating forces is increased. A similar problem arises with what is termed the hybridization, in which an electric drive machine is used more and more frequently or even forms the main source of torque and a small internal combustion engine is to be used, which, however, must be switched on and off again from the powertrain more frequently. It is therefore a challenge to provide sufficient actuation force with at the same time low parts costs and little available installation space.

This problem is exacerbated in the case of passenger cars in the small car category according to the European classification. The assemblies used in a passenger car of the small car category are not significantly reduced in size relative to passenger cars of larger car categories. Nevertheless, the available installation space for small cars is considerably smaller. Despite the large number of components, the powertrain proposed here has a smaller overall size, while at the same time, a high degree of efficiency in the torque transmission is ensured.

Passenger cars are assigned to a vehicle category according to, for example, size, price, weight and performance, wherein this definition is subject to constant change based on the needs of the market. On the US market, vehicles in the small car and microcar categories are assigned to the subcompact car category according to European classification, while in the British market they correspond to the super-mini car and city car categories respectively. Examples of the microcar category are a Volkswagen up! or a Renault Twingo. Examples of the small car category are an Alfa Romeo MiTo, Volkswagen Polo, Ford Ka+ or Renault Clio. Known hybrid vehicles are the BMW 330e or the Toyota Yaris Hybrid. Known mild hybrids are, for example, an Audi A6 50 TFSI e or a BMW X2 xDrive25e.

BRIEF DESCRIPTION OF THE DRAWINGS

The present disclosure is explained in detail below against the significant technical background with reference to the accompanying drawings, which show example embodiments. The disclosure is in no way restricted by the purely schematic drawings, and it should be noted that the drawings are not dimensionally accurate and are not suitable for defining proportions. The following are shown in the figures.

DETAILED DESCRIPTION

Figure 1:
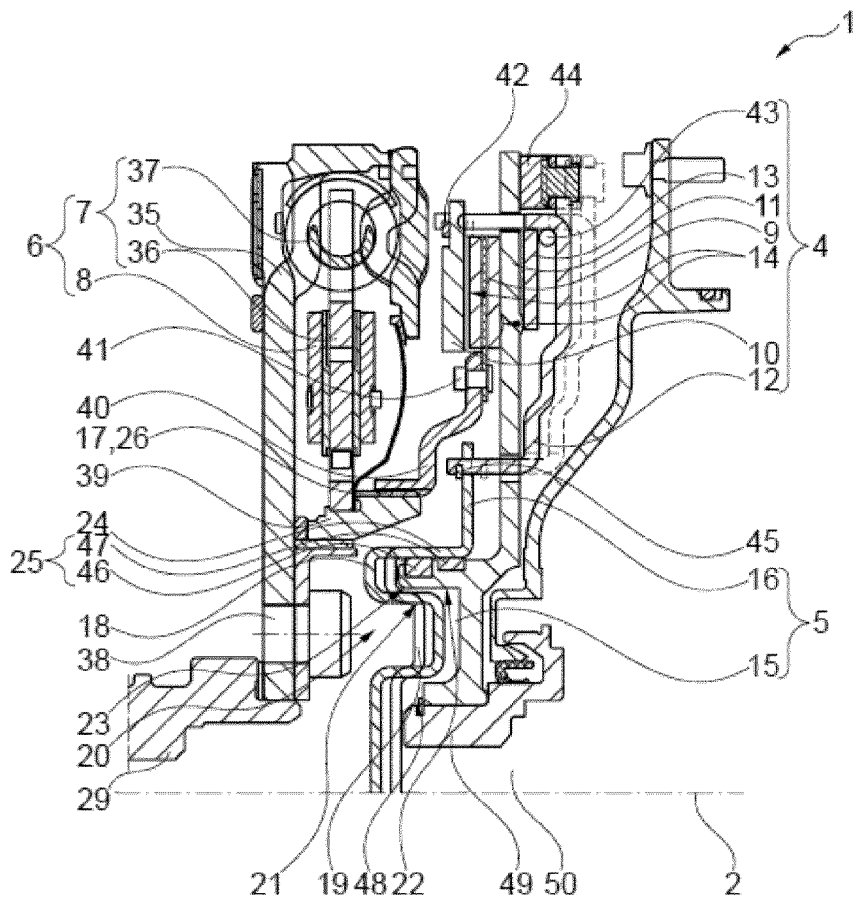
FIG. 1 shows a separating clutch with a rotational axis in a sectional view.

In FIG. 1, a separating clutch 1 with a rotational axis 2 is shown in a sectional view. The separating clutch 1 comprises a normally-closed friction pack 4, a co-rotating hydrostatic actuation device 5 and a damper device 6. The damper device 6 is designed here as a torsional vibration damper 7 having a primary flange 35, a secondary flange 36 and a spring assembly 37 formed between the primary flange 35 and the secondary flange 36 to reduce rotational irregularities. The damper device 6 is connected in a torque-transmitting manner via the primary flange 35 to a combustion engine shaft 29 of an internal combustion engine 27 (cf. FIG. 2) by means of a motor connection 38 designed as a screw connection. The interface with the friction pack 4 is formed by the secondary flange 36 by means of a torque connection 17 designed as splines 26. In addition, a centrifugal pendulum 8 is provided, which is arranged here (optionally) radially within the spring assembly 37 and radially outside the torque connection 17 and (optionally) on the secondary flange 36.

The splines 26 of the torque connection 17 are formed in such a way that the secondary flange 36 has a damper hub 39 having external teeth and the corresponding friction disk 9 has a toothed element 40 having internal teeth, which are permanently connected to one another in a torque-transmitting manner. The connection by means of the splines 26 has the advantage that the friction disk 9 can be easily displaced axially relative to the damper device 6. This reduces a drag torque. In the embodiment shown, the friction disk 9 is connected to the toothed element 40 by means of a plurality of rivets 41.

The friction disk 9 is part of the friction pack 4, wherein the friction pack 4 also has an axially displaceably mounted pressure plate 10, an axially fixed counter-plate 11, a pressure pot 12 and a plate spring 13. The frictional torque-transmitting friction surfaces 14 of the friction pack 4 are arranged in the radial extension approximately at the level of the spring assembly 37 of the damper device 6.

In the representation, the pressure pot 12 is shown in its two maximum states. On the one hand, the pressure pot 12 is shown with a two-dot-dashed line in that position corresponding to the normally-closed state and on the other hand is shown with a solid line in that position corresponding to the position corresponding to the extended state with the friction partners. The friction disk 9 is placed with its two-sided friction surfaces 14 axially between the pressure plate 10 (arranged on the left according to the illustration) and the counter-plate 11 (arranged on the right according to the illustration).

The pressure plate 10 is fixed axially to the pressure pot 12 in a form-fitting and torque-transmitting manner, and is fixed axially with the pressure pot 12 via a radial outer retaining ring 42 (enabling disassembly) and is thus connected in an axial force-transmitting manner. In this embodiment, the pressure pot 12 is (optionally) radially set up outside the friction disk 9, forming the connection to the pressure plate 10 so that it extends through the counter-plate 11. In the normally-closed state, the friction disk 9 is axially engaged between the pressure plate 10 and the counter-plate 11 in that the contact pressure force required for torque transmission is generated (solely) via the plate spring 13, and the pressure plate 10 is pulled toward the counter-plate 11. A frictional connection is thus formed axially on both sides of the friction disk 9 by means of the friction surfaces 14. Torque is transmitted from the pressure plate 10 to the counter-plate 11 via the pressure pot 12. The plate spring 13 is (optionally) supported on the counter-plate 11 and on the pressure pot 12 via a wire ring 43.

Furthermore, the pressure pot 12 is radially connected by means of a leaf spring assembly 44 distributed over the circumference to the outside of the counter-plate 11 in an axially movable manner, which is designed to act antagonistically against the plate spring 13, so that a basic tension and/or a lifting of the pressure plate 10 is ensured in the extended state.

The pressure pot 12 is (optionally) also radially arranged on the inside to extend through the counter-plate 11 for connecting to the actuation device 5, so that a clamp is formed radially around the friction surfaces 14 of the friction disk 9 by the pressure pot 12 with its two fingers extending through.

The actuation device 5 for (actively) opening the friction pack 4 comprises a pressure chamber 15 having an axially movable pressure piston 16, wherein the pressure chamber 15 is radially arranged within the torque connection 17 and in an axial overlap with the friction pack 4. The pressure piston 16 is connected by means of a radial inner locking ring 45 to the pressure pot 12. The pressure chamber 15 is also formed by the counter-plate 11 and is provided with a seal 25 to the pressure piston 16. In the embodiment shown, the pressure chamber 15 and the corresponding pressure piston 16 are divided into a radial outer section 18 and a radial inner section 19, wherein a step 20 is formed between the two sections 18, 19. The step 20 is formed with an axial wall section 21 on the pressure piston 16 with a purely parallel extension to the rotational axis 2 of the separating clutch 1. The corresponding axial rear wall 22 is formed on the counter-plate 11, so that a gap space 23 is set up in the axial and radial extension between the axial wall section 21 and the axial rear wall 22. The volume of the pressure chamber 15 is therefore very small and the pressure piston 16 is stiffened as a result of the step 20 in comparison to an embodiment of the pressure piston 16 which is planar in radial expansion.

The pressure chamber 15 has a radial external seal 25 on the axial rear wall 22 of the pressure chamber 15, which here (optionally) comprises a sealing ring 46 and a slide ring 47. The pressure piston 16 comprises a sealing wall 24 running parallel thereto, which slides over the seal 25 in accordance with the axial stroke movement of the pressure piston 16. Because in this interaction a large axial length is necessary and would need to be arranged radially inside the axial rear wall 22 of the pressure chamber 15 adding axially to the stroke, it is advantageous for a small axial installation space to arrange the seal 25 radially on the outside, i.e., facing away from the pressure chamber 15. Thus, the longitudinal section of the stroke of the pressure piston 16 and the seal 25 are namely arranged in an axially overlapping manner with one another. In addition, in the embodiment shown, an axially bridging connection to the pressure pot 12 is to be formed, so that the installation space available there (or the installation space required for this connection) is also used. Regardless of this, the seal 25 comprises a slide ring 47 which centers the pressure piston 16 by means of the axial rear wall 22. In addition, the slide ring 47 provides a first dirt repellency, particularly in a dry embodiment of the separating clutch 1, to protect the sealing surface of the sealing ring 46.

The counter-plate 11 is axially fixed via a further retaining ring 48 on the transmission shaft side on the transmission input shaft 49 (alternatively a transmission hub having splines for connection to a transmission input shaft 49) and the torque transmission between the counter-plate 11 and the transmission input shaft 49 takes place in a form-fitting manner via a toothing not shown in detail here.

In order to (actively) open the separating clutch 1, the pressure chamber 15 is pressurized with fluid pressure (for example an operating oil in a powertrain 3) via a supply line 50 arranged in the transmission input shaft 49, as a result of which the pressure piston 16 moves to the left as shown and the extended state is assumed (here the pressure piston 16 shown on the left). The pressure plate 10, which is connected via the pressure pot 12 to the pressure piston 16 is thereby released to the left, so that the pressure plate 10 is axially lifted off the friction disk 9 and the friction disk 9 is axially lifted off the counter-plate 11, and thus the friction disk 9 between the pressure plate 10 and counter-plate 11 can rotate freely. Torque transmission (above a drag torque) between the motor connection 38 and the transmission input shaft 49 is then prevented.

Figure 2:
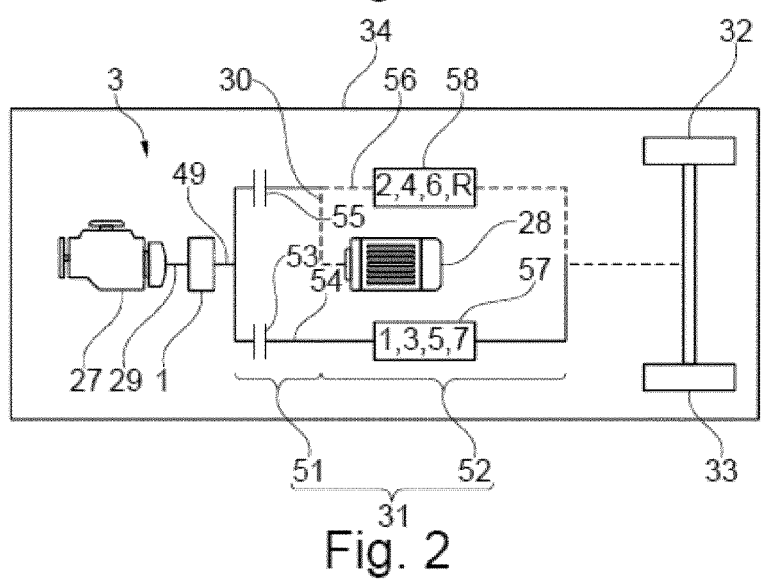
FIG. 2 shows a circuit diagram of a powertrain in a motor vehicle having a separating clutch.

FIG. 2 shows a powertrain 3 in a motor vehicle 34, shown in simplified form as a rectangle, having a separating clutch 1. The separating clutch 1 is designed, for example, as shown in FIG. 1. The powertrain 3 comprises an internal combustion engine 27, an electric drive machine 28, a separating clutch 1 and a transmission 31, here comprising a dual clutch 51 and a dual manual transmission 52. Torque transmission between the internal combustion engine 27 and the consumer 32, 33 (here comprising a left drive wheel 32 and a right drive wheel 33), more precisely here (optionally) the transmission input shaft 49, can be interrupted by means of the separating clutch 1. The internal combustion engine 27 has a combustion engine shaft 29 which is connected to the separating clutch 1 in a torque-transmitting manner. The separating clutch 1 is connected to a transmission input shaft 49 on the output side.

The transmission input shaft 49 is in turn here (optionally) connected in a torque-transmitting manner to the dual clutch 51, wherein the dual clutch 51 comprises a first partial clutch 53 to a first intermediate shaft 54 and a second partial clutch 55 to a second intermediate shaft 56. The first intermediate shaft 54 is permanently connected in a torque-transmitting manner to an odd-numbered train 57 of the double shift transmission 52. The odd-numbered train 57 comprises, for example, a first, third, fifth, and seventh gears. When the separating clutch 1 is closed (i.e., when the friction pack 4 of the separating clutch 1 is closed) and the first partial clutch 53 is closed, a torque can be transmitted from the internal combustion engine 27 via a gear of the odd-numbered train 57 onto the left-hand drive wheel 32 and right-hand drive wheel 33.

The second intermediate shaft 56 is permanently connected in a torque-transmitting manner to an even-numbered train 58 of the double shift transmission 52. The even-numbered train 58 accordingly comprises, for example, a second, fourth, sixth gear and a reverse gear. When the separating clutch 1 is closed and the second partial clutch 55 is closed, a torque can be transmitted from the internal combustion engine 27 via a gear of the even-numbered train 58 to the left-hand drive wheel 32 and right-hand drive wheel 33.

In addition, between the second partial clutch 55 and the even-numbered train 58 of the double shift transmission 52, an electric drive machine 28 is arranged according to a variant of what is termed the P3-configuration. The electric drive machine 28 is permanently connected to the consumer 32, 33 (and independently of the states of the partial clutches 53, 55). The rotor shaft 30 of the electric drive machine 28 is connected to the second intermediate shaft 56 in a torque-transmitting manner. Because the speed range of an electric drive machine 28 is often greater than that of an internal combustion engine 27, it is sufficient for the torque of the electric drive machine 28 to be conducted solely via one of the two trains 58, 57.

In one configuration (not shown here), a further separating clutch (for example positively locking torque-transmitting) is provided between the drive wheels 32, 33 and the double shift transmission 52. A torque transmission can then also be interrupted between the electric drive machine 28 and the drive wheels 32, 33.

In one embodiment, the powertrain 3 can be operated solely by means of the internal combustion engine 27, i.e., propulsion of the motor vehicle 34 can be generated by means of the drive wheels 32, 33. If an even gear or reverse gear (in the even-numbered train 58) is engaged in this state, the second partial clutch 55 must be closed. If an odd gear is engaged in this state (in the odd-numbered train 57), both partial clutches 53, 55 must be closed. In a hybrid driving mode, in addition to the torque of the internal combustion engine 27, the electric drive machine 28 can also output a torque onto the drive wheels 32, 33. Alternatively or additionally, propulsion of the motor vehicle 34 can be generated solely by means of a torque transmission from the electric drive machine 28 onto the drive wheels 32, 33, in that the separating clutch 1 is open.

With the separating clutch proposed here, a compact structure is achieved without disadvantages relating to the dynamic behavior, for example the required transmittable torque.

REFERENCE NUMERALS

1 Separating clutch
2 Rotational axis
3 Powertrain
4 Friction pack
5 Actuation device
6 Damper device
7 Torsional vibration damper
8 Centrifugal pendulum
9 Friction disk
10 Pressure plate
11 Counter-plate
12 Pressure pot
13 Plate spring
14 Frictional surface
15 Pressure chamber
16 Pressure piston
17 Torque connection
18 Radial outer section
19 Radial inner section
20 Step
21 Axial wall section
22 Axial rear wall
23 Gap space
24 Sealing wall
25 Seal
26 Splines
27 Internal combustion engine
28 Electric drive machine
29 Internal combustion engine shaft
30 Rotor shaft
31 Transmission
32 Left drive wheel
33 Right drive wheel
34 Motor vehicle
35 Primary flange
36 Secondary flange
37 Spring assembly
38 Motor connection
39 Damper hub
40 Toothed element
41 Rivet
42 Radial outer locking ring
43 Wire ring
44 Leaf spring assembly
45 Radial internal locking ring
46 Sealing ring
47 Slide ring 48 Transmission shaft side retaining ring
49 Gearbox input shaft
50 Feed line
51 Double clutch
52 Dual manual transmission
53 First partial clutch
54 First intermediate shaft
55 Second partial clutch
56 Second intermediate shaft
57 Odd-numbered train
58 Even-numbered train

The invention claimed is:

1. A separating clutch with a rotational axis for a powertrain, comprising:
    a normally-closed friction pack for transmitting a torque in an engaged state;
    a co-rotating hydrostatic actuation device for switchable release of the engaged state of the friction pack; and
    a damper device comprising a torsional vibration damper or a centrifugal pendulum, wherein the co-rotating hydrostatic actuation device is arranged in an axial overlap with the damper device in an extended state, wherein
    the friction pack comprises a friction disk, a pressure plate, a counter-plate, a pressure pot and a disk spring;
    the disk spring is supported between the counter-plate and the pressure pot; and
    the pressure pot is arranged extending through the counter-plate for force-transmitting contact with:
        the pressure plate, radially outside a friction surface of the friction disk, and
        the co-rotating hydrostatic actuation device, radially inside the friction surface of the friction disk.

2. The separating clutch of claim 1, wherein
    the co-rotating hydrostatic actuation device comprises a pressure chamber having an axially movable pressure piston which is radially arranged within the friction pack.

3. The separating clutch according to claim 2, wherein
    the pressure piston has a radial outer section and a radial inner section,
    a step is formed between the radial outer section and the radial inner section, the step having a wall section with an axial extension, and
    a gap space is formed within the axial extension between the wall section and a corresponding lateral rear wall of the pressure chamber.

4. The separating clutch according to claim 3, wherein
    the pressure piston is formed radially outside a sealing wall;
    the lateral rear wall is lateral to the sealing wall;
    the pressure chamber is formed to be parallel to the lateral rear wall;
    the separating clutch comprises a radial external seal to the sealing wall of the pressure piston; and
    the pressure piston is centered by means of the radial external seal.

5. The separating clutch according to claim 1, wherein
the friction disk is permanently torque-transmittingly connected to the damper device by means of splines.

6. A powertrain, comprising:
    at least one drive machine having a machine shaft;
    a transmission for transmitting a torque of the machine shaft to a consumer; and
    the separating clutch of claim 1, wherein a torque between at least one of the drive machines and the consumer can be releasably transmitted by means of the separating clutch.

7. A motor vehicle having
    at least one drive wheel which can be driven by means of the powertrain according to claim 6 for propelling the motor vehicle.

8. A separating clutch for a powertrain, comprising:
    a rotational axis;
    a friction pack for transmitting a torque in an engaged state;
    a damper device comprising a torsional vibration damper or a centrifugal pendulum; and
    an actuation device for selectively releasing the engaged state, the actuation device being arranged in an axial overlap with the damper device, wherein:
    the friction pack comprises:
        a friction disk;
        a pressure plate;
        a counter-plate;
        a pressure pot; and
        a disk spring supported between the counter-plate and the pressure pot;
    the friction disk comprises a friction surface; and
    the pressure pot extends through the counter-plate to contact:
        the pressure plate, radially outside of the friction surface; and
        the actuation device, radially inside of the friction surface.

9. The separating clutch of claim 8, wherein:
the actuation device comprises a pressure chamber having a pressure piston; and
the pressure piston is axially movable and arranged radially within the friction pack.

10. The separating clutch of claim 9, wherein:
the pressure piston comprises:
    a radial outer section;
    a radial inner section;
    a step comprising a wall section between the radial outer section and the radial inner section, the wall section comprising a first axial extension;
the pressure chamber comprises a lateral rear wall; and
a gap space is formed between the wall section and the lateral rear wall, the gap space comprising a second axial extension.

11. The separating clutch of claim 10 further comprising a seal disposed in the lateral rear wall, wherein:
the pressure piston comprises a sealing wall; and
the lateral rear wall is parallel to the sealing wall.

12. The separating clutch of claim 11 wherein the pressure piston is centered by the seal.

13. The separating clutch of claim 8 wherein:
the actuation device comprises a pressure chamber having a pressure piston;
the damper device comprises a damper hub; and
the pressure piston is arranged radially within a torque connection between the friction disk and the damper hub.

14. The separating clutch of claim 8, wherein the friction disk is permanently torque-transmittingly connected to the damper device.

15. The separating clutch of claim 8, wherein the friction disk is permanently torque-transmittingly connected to the damper device by splines.

* * * * *